United States Patent [19]

Friesen

[11] Patent Number: 4,970,849

[45] Date of Patent: Nov. 20, 1990

[54] SWATH PICK-UP FOR A COMBINE HARVESTER

[76] Inventor: David Friesen, 305-1825-4th Street, North, Cranbrook, British Columbia, Canada, V1C 3L9

[21] Appl. No.: 429,939

[22] Filed: Nov. 1, 1989

[51] Int. Cl.$^5$ .................. A01D 78/14; A01D 89/00
[52] U.S. Cl. ................................ 56/12.4; 56/12.8; 56/344
[58] Field of Search ............... 56/12.4, 119, 220, 364, 56/344, 12.5, 12.8, 14.4, 16.4, 16.6, DIG. 8, DIG. 21

[56] References Cited

U.S. PATENT DOCUMENTS

| | | | |
|---|---|---|---|
| 2,832,187 | 4/1958 | Johnson | 56/220 X |
| 2,836,026 | 5/1958 | Gray et al. | 56/119 |
| 3,319,408 | 5/1967 | Landwehr | 56/220 |
| 4,161,859 | 7/1979 | Storm et al. | 56/364 |
| 4,303,079 | 12/1981 | Claas et al. | 56/12.8 X |
| 4,498,278 | 2/1985 | Friesen | 56/364 |

*Primary Examiner*—Stephen J. Novosad
*Attorney, Agent, or Firm*—Adrian D. Battison; Stanley G. Ade; Murray E. Thrift

[57] ABSTRACT

A pick-up header for a combine is designed to improve the control of the material from a windrow as it is picked up from the ground and transported to the feeder housing of the combine. Immediately rearwardly of the pick-up fingers is provided an air transportation device including a plurality of openings through which air is forced to carry the material rearwardly toward the feeder housing while allowing the escape of stones. Rearwardly of the air transportation device is a sheet which inclines downwardly toward the curved feeding surface of the feeder housing with the pick-up, air transportation device and guide sheet all pivotally mounted relative to the feeder housing. A feed roller includes a plurality of fingers which rotate with the roller about an eccentric axis so that the fingers project outwardly at the front of the roller to a length extending just to the rear of the pick-up fingers and then retract at the rear of the roller. The roller is of larger diameter than conventional allowing the fingers to project forwardly to a greater extent than conventional.

19 Claims, 2 Drawing Sheets

SWATH PICK-UP FOR A COMBINE HARVESTER

BACKGROUND OF THE INVENTION

This invention relates to a swath pick-up for a combine harvester.

Conventionally a combine harvester includes a feeder housing which is mounted on the combine for raising and lowering movements. Immediately in front of the feeder housing and fixedly mounted thereon is a guide pan arrangement which provides a pan surface which directs the crop material toward the feeder housing. On top of the pan surface is mounted an auger element including a cylindrical drive body with a pair of flight portions attached to the cylindrical drive body and arranged at respective ends thereof so as to guide crop material from the ends of the pan inwardly towards the feeder housing. In some cases a central bare section of the cylindrical body carries a plurality of radially projecting fingers which rotate with the auger element but have an axis of rotation offset from the axis of the auger element so that the finger extend and retract cyclically as the auger element rotates. This tends to grasp material forwardly of the auger element and sweep it under the auger element into the feeder housing while the retraction of the fingers rearwardly of the auger element prevents the fingers from carrying the material up and over the auger element in a wrapping action. A separate pick-up section is pivotally mounted to the pan and feeder housing for pivotal movement about an axis at the front of the pan. The pick-up section includes a rotatable pick-up element including a plurality of fingers which rotate about an axis transverse to the direction of movement for lifting the crop from the ground and directing it over the pick-up element. A conveyor which is generally a draper type conveyor is positioned immediately rearwardly of the pick-up element so that the material from the pick-up element is dropped onto the draper and then carried rearwardly to the pan.

While pick-ups of this type have been widely used and have become generally accepted, they still have a number of disadvantages and problems particularly in relation to the feeding of the material from the pick-up rearwardly onto the pan and into the feeder housing.

It is one object of the present invention, therefore, to provide an improved pick-up which provides an improved movement of the material from the pick-up element rearwardly into the feeder housing.

According to the first aspect of the invention there is provided a pick-up for crop material in a swath for feeding into a feeder housing of a combine harvester, the pick-up comprising frame means, means for attachment of the frame means to the feeder housing, a feed pan member having a width transverse to a direction of motion of the combine greater than the feeder housing an arranged to define a surface over which the crop material travels for passage into the feeder housing, a cylindrical auger element mounted above the pan member with a longitudinal axis thereof transverse the direction of movement including flight means mounted on a peripheral surface of the auger element for driving the crop material inwardly from sides of the pan member toward the feeder housing, a pick-up member at a front of the pick-up including a plurality of pick-up elements rotatable about an axis transverse to said direction of movement for lifting the crop material from the ground over the pick-up member, and a conveyor member arranged to provide force on the crop material at a position rearwardly of said pick-up member for transporting the crop material from said pick-up member onto said pan member, the conveyor member defining a conveyor surface including opening means therein and means for generating an air flow through the opening means providing a force on the crop material in an upward and rearward direction.

According to a second aspect of the invention there is provided a pick-up for crop material in a swath for feeding into a feeder housing of a combine harvester, the pick-up comprising frame means, means for attachment of the frame means to the feeder housing, a feed pan member having a width transverse to a direction of motion of the combine greater than the feeder housing and arranged to define a surface over which the crop material travels for passage into the feeder housing, a cylindrical auger element mounted above the pan member with a longitudinal axis thereof transverse the direction of movement including flight means mounted on a peripheral surface of the auger element for driving the crop material inwardly from sides of the pan member toward the feeder housing, a pick-up member at a front of the pick-up including a plurality of pick-up elements rotatable about an axis transverse to said direction of movement for lifting the crop material from the ground over the pick-up member, and a conveyor member arranged to provide force on the crop material at a position rearwardly of said pick-up member for transporting the crop material from said pick-up member onto said pan member, the pan member including a curved surface portion flowing the curvature of the peripheral surface of the auger element and a connecting surface portion extending from a rear edge of the conveyor member to a front edge of the curved surface portion, the curved surface portion being rigidly attached to the feeder housing for movement therewith and the pick-up member, conveyor member and connecting surface portion being mounted on a frame section separate from the feeder housing and mounted for pivotal movement relative to the feeder housing about an axis transverse to the direction of movement.

According to a third aspect of the invention there is provided a pick-up for crop material in a swath for feeding into a feeder housing of a combine harvester, the pick-up comprising frame means, means for attachment of the frame means to the feeder housing, a feed pan member having a width transverse to a direction of motion of the combine greater than the feeder housing and arranged to define a surface over which the crop material travels for passage into the feeder housing, a cylindrical auger element mounted above the pan member with a longitudinal axis thereof transverse the direction of movement including flight means mounted on a peripheral surface of the auger element for driving the crop material inwardly from sides of the pan member toward the feeder housing, and a pick-up member at a front of the pick-up including a plurality of pick-up elements rotatable about an axis transverse to said direction of movement for lifting the crop material from the ground over the pick-up member, the auger member including a first and a second flight portion at respective ends thereof each configured to urge crop material inwardly from the respective end toward said feeder housing and a central portion free from said flight portions, and a plurality of fingers mounted on the auger element at said central portion and projecting in a generally radial direction therefrom, the fingers being arranged to rotate with the auger element and arranged to have an axis of rotation offset from the axis of the auger element so that the fingers extend and retract relative to the outer peripheral surface of the auger element as the auger element rotates with the position of maximum extension being forwardly of the auger element and a position a minimum extension being rearwardly of the auger element adjacent to the feeder housing, the diameter of the auger element, the length of the fingers and the distance of offset of the axis of rotation of the fingers from the axis of the auger element to being such that the fingers project at their maximum extension to a position forwardly of said pan member.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

BRIEF DESCRIPTION OF THE DRAWINGS

In the drawings like characters of reference indicate corresponding parts in the different figures.

DETAILED DESCRIPTION

Figure 1:
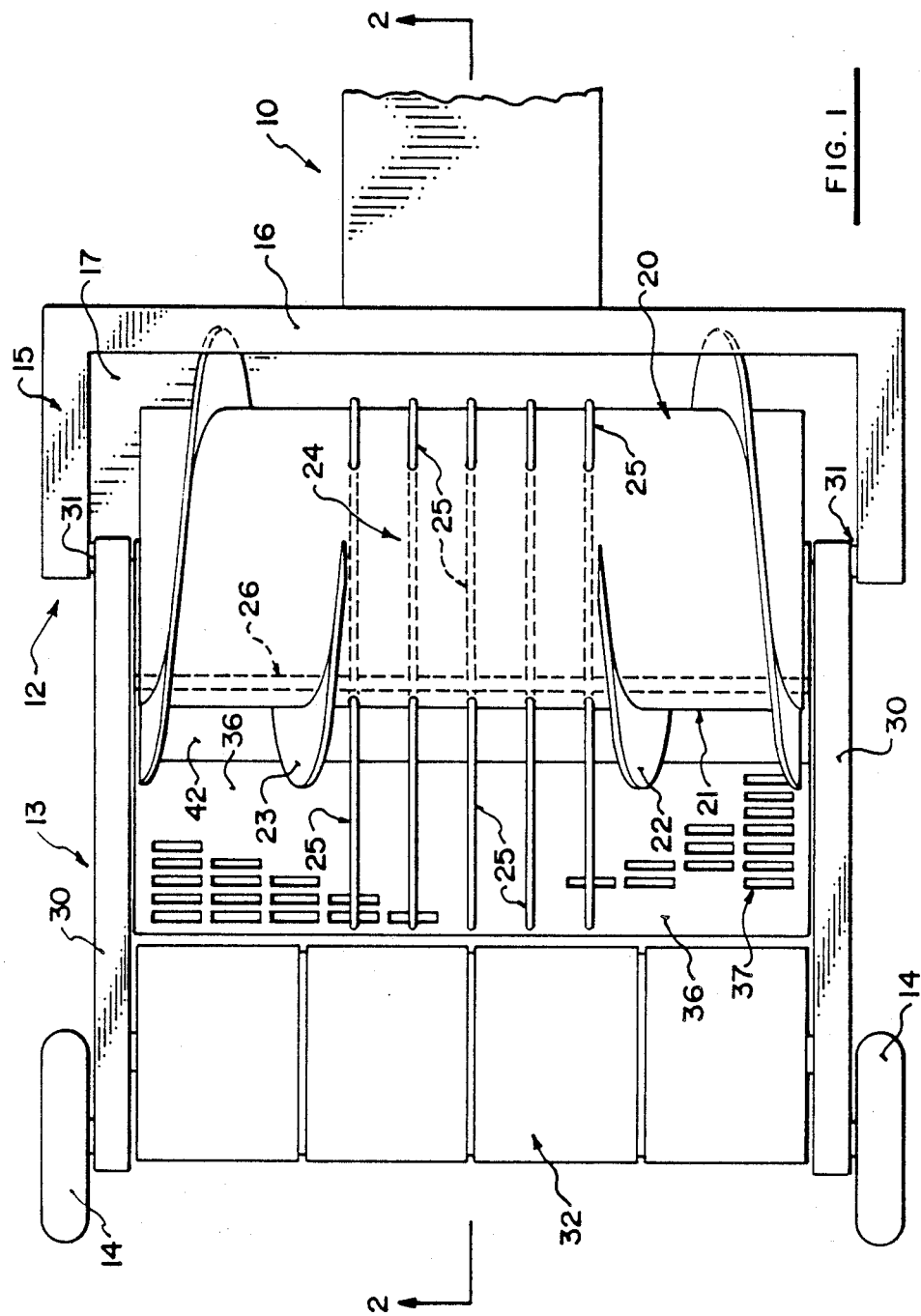
FIG. 1 is a top plan view of a pick-up according to the invention.

A feeder housing of a combine is generally indicated at 10 and comprises an elongate duct extending from a front open mouth 11 in a direction generally upwardly and rearwardly from the open mouth to the parts of the combine (not shown). The duct is generally of rectangular cross section defining a rectangular open mouth 11 through which the material is fed to the combine.

The pick-up mounted at the front of the feeder housing is formed in two parts generally indicated at 12 and 13 respectively with the part 12 attached directly to the feeder housing and fixed relative thereto for upward and downward movement therewith. The front portion of the pick-up 13 is coupled to a front edge of the rear portion 12 and is pivotally mounted relative thereto for up and down movement about a transverse axis with the forward end of the front portion 13 mounted on ground wheels 14 which control the height of the front edge of the pick-up.

The rear portion 12 includes a frame 15 having a main cross beam 16. The details of the frame are not included and the frame is shown schematically since this portion of the frame is generally of conventional construction and will be apparent to one skilled in the art. The frame supports a curved pan 17 which extends across the width of the pick-up to a width greater than that of the feeder housing. The curved pan portion commences at a forward most edge 18 and then defines a part cylinder extending upwardly and rearwardly therefrom toward the feeder housing.

Figure 2:
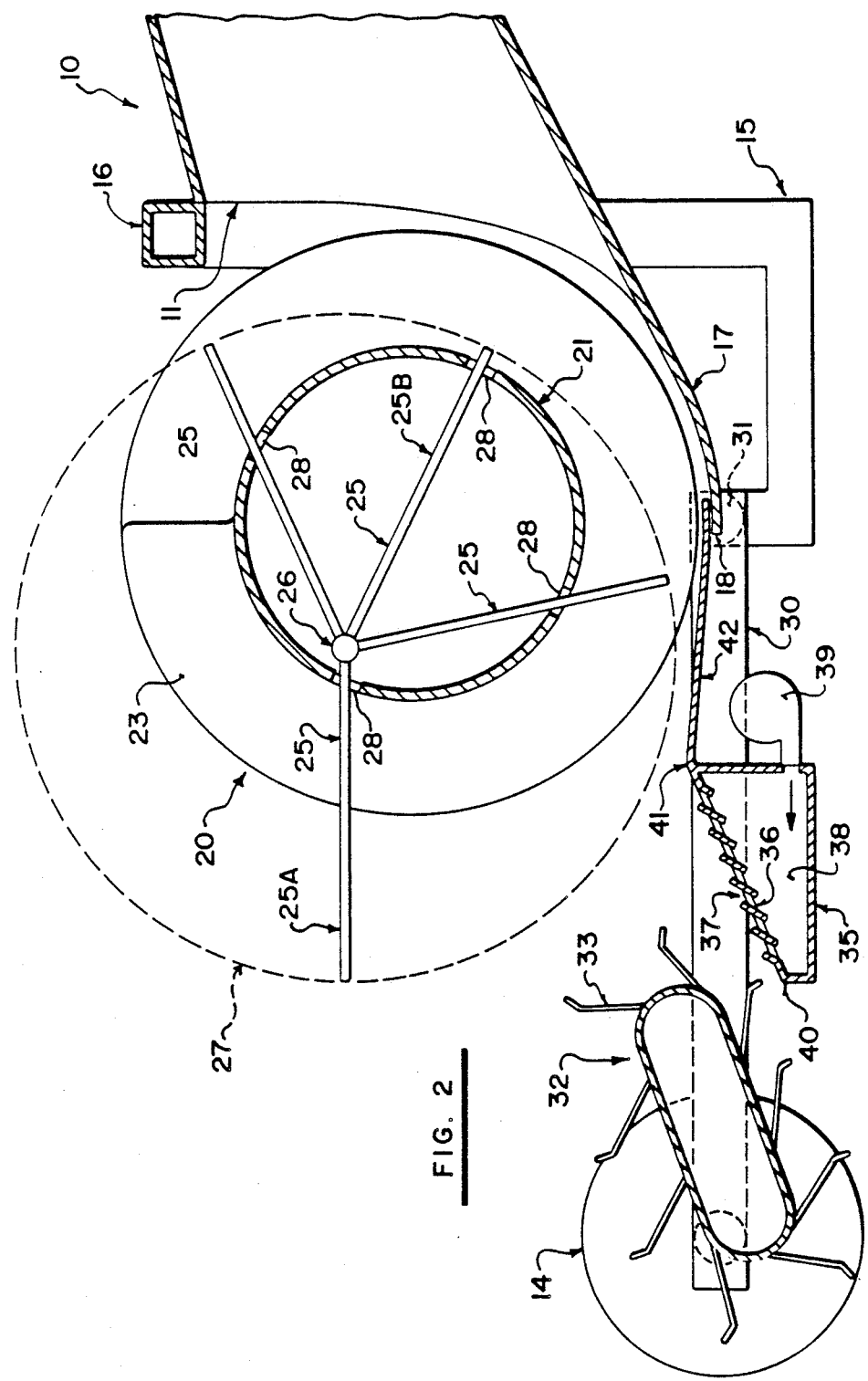
FIG. 2 is a schematic cross sectional view along the lines II—II of FIG. 1.

On top of the pan portion is mounted an auger member 20. The auger member comprises a drive cylindrical body 21 which is rotatable about its longitudinal axis with its longitudinal axis arranged transverse the direction of motion of the combine and concentric with the curvature of the curved pan portion 17. The cylindrical body has a diameter greater than 15 inches and preferably of the order of 24 inches which is significantly greater than the similar portion of a conventional auger where a large size auger body might be of the order of 12 inches. The cylindrical body 21 carries two separate flight sections 22 and 23 which act as auger flights to direct crop material from the sides of the auger and the underlying pan inwardly toward the feeder housing. As viewed in FIG. 2, the auger member rotates in an anticlockwise direction so that the flight tends to force the feed material inwardly and then rearwardly. A center section of the cylindrical body is bare as indicated at 24 and this center section is aligned with the feeder housing since of course it is not necessary to move the crop material axially at this point. At the bare section the cylindrical body carries a plurality of fingers 25 which project generally radially from the cylindrical body. There are a series of fingers across the width of the cylindrical body as shown in FIG. 1 and also there are fingers which project at angularly spaced positions around the cylindrical body as shown in FIG. 2. The fingers are mounted upon an elongate support member 26 which extends parallel to the axis of the cylindrical body but offset from the axis in a direction upwardly and forwardly from the axis as best shown in FIG. 2. The support member 26 and the cylindrical body are supported on the frame 15 for rotation about their respective axes but are held against movement transverse to the axis. It is appreciated from inspection of FIG. 2, therefore, that the fingers rotate about the axis of the support member 26 so that the outside end of the fingers follows a path of rotation indicated at 27. The cylindrical body 21 rotates about its own axis. The fingers project from the interior of the cylindrical body through a respective one of a plurality of holes 28 in the cylindrical body. Although not shown there is provided a guide element in the respective hole 28 so that the guide element controls the position of the respective finger 25 and prevents direct metal to metal contact between the finger and the cylindrical body.

As shown in FIG. 2, therefore, the fingers extend outwardly from the surface of the cylindrical body to different extents depending upon the angular position of the respective finger. Thus the maximum extent is at the forward and upward position of the fingers as indicated at 25A. The most retracted position is indicated at 25B where the finger only just projects through the surface of the cylindrical body by a sufficient distance to maintain it projecting through the respective opening 28.

Fingers of this type are generally known and therefore the details of the support member 26 and the cooperation between the finger and the cylindrical body are not shown in detail.

In this case, however, it will be noted that the fingers are of maximum length and the support member 26 is positioned as close as possible to the inside surface of the cylindrical body. In this way the fingers project forwardly to an extent significantly greater than that of the conventional arrangement.

In the example where the cylindrical body is 24 inches in diameter, the fingers would be of the order of 22 inches in length. In this way the fingers act in the form of a reel which can engage the crop a long way forward of the auger to more effectively control the movement of the crop material as a passage from the pick-up element at the front end through underneath the auger.

The depth of the auger flight is also significantly greater than a conventional arrangement wherein the conventional arrangement the depth is of the order of 4 inches whereas in this embodiment the depth is of the order of 8 inches thus providing greater area for the passage of the crop material underneath the cylindrical body 21.

The front portion of the pick-up comprises a frame schematically indicated at 30 which is pivotally connected at 31 to a forward end of the frame 15. The frame is shown only schematically and its connection to the various parts is omitted for convenience of illustration but the construction of the frame will be apparent to one skilled in the art.

The frame 30 carries a pick-up element 32 which is again shown only schematically. The pick-up element includes a plurality of fingers 33 which project outwardly therefrom. Conventional pick-ups comprise a plurality of bands of a fabric material which carry the fingers on the outer surface and rotate about a pair of rollers. An alternative form of pick-up is shown in U.S. Pat. No. 4,498,278 (Freisen) and this is the preferred type of pick-up for which the present invention is concerned. Although the details are not included in the present applications the will be apparent from the above mentioned patent.

Immediately rearwardly of the pick-up is mounted a conveying element 35. The conveying element includes an upper surface 36 which has a plurality of louver openings 37. The surface 36 is mounted over a plenum chamber 38 connected to a fan 39 (shown only schematically) so that an airflow from the fan 39 can pass in the plenum chamber and through the louvers onto the upper surface 37. The upper surface is inclined upwardly and rearwardly from a forward most end 40 to a rear end 41 at a pan portion 42.

The louver openings in the surface 36 generate an airflow which is upwardly and rearwardly moving to cause the crop material deposited from the pick-up 32 to move upwardly and rearwardly toward the rear portion of the pick-up. The airflow is sufficient to lift the crop material so that it is carried in a raised position relative to the surface and this helps to properly transport the relatively light crop material in the rearward direction and at the same time gives the opportunity for heavy material to drop out of the crop material and roll downwardly and forwardly along the surface escaping from the front end 40 of the surface between that front end and the underside of the pick-up 32 at which there is suitable space.

The pan portion 42 is fixed with the surface 36 to the frame 30 so these portions pivot relative to the frame 15 and thus relative to the front edge of the curved pan 17. The pan portion 42 is inclined downwardly and rearwardly from the top edge 41 of the surface 36 so as to help the material slide downwardly toward the curved pan portion 17. The rear edge of the pan portion 42 overlaps slightly the front edge of the curved pan portion 17 so as to provide a proper transmission of the material from the one pan portion to the rear pan portion.

The pivoting action of the pan portion 42 about the rear edge of the pan portion 17 ensures that the pan portion 42 remains in most cases in its downwardly and rearwardly inclined position. If the pan portion 42 were connected to the pan portion 17, downward movement of the feeder housing would cause the pan portion 42 to incline so that it looses its rearward and downward inclination thus reducing the proper gravitational feed effect which improves the transmission of the material to the feeder housing.

The fingers 25 project from the reel to the forward most maximum extent at which they extend to a position forward of the pan and preferably overlying the front edge of the conveyor element. This helps to grasp and guide the crop material unit is fed rearwardly.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A pick-up for crop material in a swath for feeding into a feeder housing of a combine harvester, the pick-up comprising frame means, means for attachment of the frame means to the feeder housing, a feed pan member having a width transverse to a direction of motion of the combine greater than the feeder housing and arranged to define a surface over which the crop material travels for passage into the feeder housing, a cylindrical auger element mounted above the pan member with a longitudinal axis thereof transverse the direction of movement including flight means mounted on a peripheral surface of the auger element for driving the crop material inwardly from sides of the pan member toward the feeder housing, a pick-up member at a front of the pick-up including a plurality of pick-up elements rotatable about an axis transverse to said direction of movement for lifting the crop material from the ground over the pick-up member, and a conveyor member arranged to provide force on the crop material at a position rearwardly of said pick-up member for transporting the crop material from said pick-up member onto said pan member, the conveyor member defining a conveyor surface including opening means therein and means for generating an air flow through the opening means providing a force on the crop material in an upward and rearward direction.

2. The invention according to claim 1 wherein the conveyor surface is inclined in a direction upwardly and rearwardly and wherein there is a space between the rear end of the pick-up member and a forward edge of the conveyor surface so that stones can fall from the lifted crop material onto the surface and then tend to roll forwardly and downwardly for discharge through said space.

3. The invention according to claim 1 wherein the opening means comprises a plurality of louvers.

4. The invention according to claim 1 wherein the pan member includes a curved surface portion following the curvature of the peripheral surface of the auger element and a connecting surface portion extending from a rear edge of the conveyor member to a front edge of the curved surface portion, the curved surface portion being rigidly attached to the feeder housing for movement therewith and the pick-up member, conveyor member and connecting surface portion being mounted on a frame section separate from the feeder housing and mounted for pivotal movement relative to the feeder housing about an axis transverse to the direction of movement.

5. The invention according to claim 4 wherein the connecting surface portion is inclined downwardly and rearwardly toward said curved surface portion.

6. The invention according to claim 1 wherein the auger element includes a first and a second flight portion at respective ends thereof each configured to urge crop material inwardly from the respective end toward said feeder housing and a central portion free from said flight portions, and a plurality of fingers mounted on the auger element at said central portion and projecting in a generally radial direction therefrom, the fingers being arranged to rotate with the auger element and arranged to have a axis of rotation offset from the axis of the auger element so that the fingers extend and retract relative to the outer peripheral surface of the auger element as the auger element rotates with the position of maximum extension being forwardly of the auger element and a position a minimum extension being rearwardly of the auger element adjacent to the feeder housing, the diameter of the auger element, the length of the fingers and the distance of offset of the axis of rotation of the fingers from the axis of the auger element to being such that the finger project at their maximum extension to a position forwardly of the pan.

7. The invention according to claim 6 wherein the forward most point of the fingers extends to a position above a front edge of the conveyor member.

8. The invention according to claim 6 wherein the diameter of the peripheral surface is greater than 15 inches.

9. The invention according to claim 8 wherein the diameter of the peripheral surface is of the order of 24 inches.

10. The invention according to claim 6 wherein the distance of the outermost edge of the flight from the peripheral surface is greater than 4 inches.

11. The invention according to claim 10 wherein the distance of the outermost edge of the flight from the peripheral surface is of the order of 8 inches.

12. The invention according to claim 6 wherein the length of the fingers is slightly less than the diameter of the peripheral surface and wherein the axis of rotation of the fingers is arranged immediately adjacent the peripheral surface.

13. A pick-up for crop material in a swath for feeding into a feeder housing of a combine harvester, the pick-up comprising frame means, means for attachment of the frame means to the feeder housing, a feed pan member having a width transverse to a direction of motion of the combine greater than the feeder housing and arranged to define a surface over which the crop material travels for passage into the feeder housing, a cylindrical auger element mounted above the pan member with a longitudinal axis thereof transverse the direction of movement including flight means mounted on a peripheral surface of the auger element for driving the crop material inwardly from sides of the pan member toward the feeder housing, a pick-up member at a front of the pick-up including a plurality of pick-up elements rotatable about an axis transverse to said direction of movement for lifting the crop material from the ground over the pick-up member, and a conveyor member arranged to provide force on the crop material at a position rearwardly of said pick-up member for transporting the crop material from said pick-up member onto said pan member, said pan member including a curved surface portion following the curvature of the peripheral surface of the auger element and a connecting surface portion extending from a rear edge of the conveyor member to a front edge of the curved surface portion, the curved surface portion being rigidly attached to the feeder housing for movement therewith and the pick-up member, conveyor member and connecting surface portion being mounted on a frame section separate from the feeder housing and mounted for pivotal movement relative to the feeder housing about an axis transverse to the direction of movement.

14. The invention according to claim 4 wherein the connecting surface portion is inclined downwardly and rearwardly toward said curve surface portion.

15. A pick-up for crop material in a swath for feeding into a feeder housing of a combine harvester, the pick-up comprising frame means, means for attachment of the frame means to the feeder housing, a feed pan member having a width transverse to a direction of motion of the combine greater than the feeder housing and arranged to define a surface over which the crop material travels for passage into the feeder housing, a cylindrical auger element mounted above the pan member with a longitudinal axis thereof transverse the direction of movement including flight means mounted on a peripheral surface of the auger element for driving the crop material inwardly from sides of the pan member toward the feeder housing, and a pick-up member at a front of the pick-up including a plurality of pick-up elements rotatable about an axis transverse to said direction of movement for lifting the crop material from the ground over the pick-up member, said auger member including a first and a second flight portion at respective ends thereof each configured to urge crop material inwardly from the respective end toward said feeder housing and a central portion free from said flight portions, and a plurality of fingers mounted on the auger element at said central portion and projecting in a generally radial direction therefrom, the fingers being arranged to rotate with the auger element having arranged to have an axis of rotation offset from the axis of the auger element so that the fingers extend and retract relative to the outer peripheral surface of the auger element as the auger element rotates with the position of maximum extension being forwardly of the auger element and a position a minimum extension being rearwardly of the auger element adjacent to the feeder housing, the diameter of the auger element, the length of the fingers and the distance of offset of the axis of rotation of the fingers from the axis of the auger element to being such that the finger project at their maximum extension to a position forwardly of said pan member.

16. The invention according to claim 15 including a conveyor member between said pick-up member and said pan member wherein the forward most point of the fingers extends to a position above a front edge of the conveyor member.

17. The invention according to claim 15 wherein the diameter of the peripheral surface is of the order of 24 inches.

18. The invention according to claim 15 wherein the distance of the outermost edge of the flight from the peripheral surface is of the order of 8 inches.

19. The invention according to claim 15 wherein the length of the fingers is slightly less than the diameter of the peripheral surface and wherein the axis of rotation of the fingers is arranged immediately adjacent the peripheral surface.

* * * * *